UNITED STATES PATENT OFFICE.

PIETER WICHERS WIERDSMA, OF SCHRANS, AND JOHANNES KUIPERS, OF LEEUWARDEN, NETHERLANDS, ASSIGNORS TO THE KUMA COMPANY, LIMITED, OF LONDON, ENGLAND.

PROCESS OF TREATING VEGETABLE WASTE.

SPECIFICATION forming part of Letters Patent No. 640,725, dated January 2, 1900.

Application filed December 28, 1897. Serial No. 664,076. (No specimens.)

*To all whom it may concern:*

Be it known that we, PIETER WICHERS WIERDSMA, of Schrans, near Leeuwarden, and JOHANNES KUIPERS, of Leeuwarden, Netherlands, subjects of the Queen of the Netherlands, have invented certain new and useful Improvements in Processes of Treating Vegetable Waste, of which the following is a specification.

This invention relates to the manufacture of a new or improved substance or product suitable for use as a substitute for vulcanite, hard woods, or other hard materials or for other uses or purposes for which the same may be applicable, and has for its object to utilize certain parts of the potato or similar tubers, particularly the refuse or part of the refuse produced in the manufacture of various products from potatoes or similar tubers.

In the manufacture of potato-flour from potatoes after the "flour" has been separated from the mass produced from the potatoes the refuse or part remaining is treated in the following manner, so as to produce therefrom the new or improved substance or product according to the present invention, which embodies certain improvements on or modifications of the invention described in the United States Patent No. 581,319: This refuse or part remaining after the extraction of the flour contains water, peel, fiber or cellular material, and potato-flour residue, and in the form usually obtained—viz., in a pulpy mass—is estimated to contain, first, water; second, peel; third, matters soluble in cold water, chiefly dextrine; fourth, starch and starchy materials, and, fifth, cellular or fibrous material.

It is the object of the present invention to separate the three first-named materials from the two last-named materials and to reject the water, peel, and soluble matter and to retain and treat the starch and fibrous material and utilize the latter as follows:

The aforesaid refuse is mixed with water (advantageously a copious supply of cold water) and stirred well or otherwise agitated to obtain a liquid pulpy mass somewhat of the consistency of cream, the supply of added water being sufficient to allow the whole mass to be sieved or strained or submitted to any suitable separating process or action to separate or remove the particles or coaser parts that formed the peel. This sifting or assorting process or separating action should be done very carefully, so that a minimum (if any) of the peel or coaser parts remain in the sieved material, the water added as above serving or assisting in serving to carry the starch or starchy material along with the fibrous or cellular material, and the liquid mass is now thoroughly washed to remove all soluble matter. This done, the mass may now (or later) be bleached, if desired, in any suitable manner, and the same may now (or later) be dyed in any suitable manner and color desired. The mass is now dried and disintegrated. This dried mass (advantageously in the form of a fine powder) is now treated according to the present invention in such wise as to provide the mass with a strong gum or mucilage incorporated in or with the mass, and this may be effected in either of the following manners:

(*a*) By adding water (advantageously hot water) to the mass in suitable proportions—say three parts of the powder to four parts of water—and intimately mixing the mass in a suitable vessel and raising the temperature of the mass to 80° or 85° centigrade, or thereabout, whereby the starch or starchy matter in the mass is converted into a starch paste, which will serve to cause the cohesion of the whole mass when molded under pressure. In this treatment it is an advantage to use a small percentage of hydrochloric acid to assist in converting the starch into dextrine. By the addition of a suitable proportion—say ten per cent.—of an astringent—such as a solution of alum, tannin, &c.—the resistance of the resulting product to water or moisture is increased.

(*b*) Instead of the treatment above described under (*a*) the dried mass, advantageously in the form of a powder, is intimately mixed, by kneading or otherwise, with a suitable gum (such as rosin) or mucilage (such as animal glue or gelatin,) say twenty to forty per cent.—more or less—which gum or mucilage may either of itself be waterproof or which may be mixed as an aqueous solution and then rendered insoluble by precipitation by a suitable astringent—such as alum, tannin, &c.—and by this means the resulting product is rendered waterproof or still more impervious to the action of water or moisture than the product by the first-named process. In this (b) process the temperature of the solution or mass is not raised, as in the first-named (or a) process. The material is now thoroughly dried and reduced to a powder and (either with or without sifting) is then molded under great pressure into the desired forms or shapes.

By this invention is produced a homogeneous material of great closeness of texture, which can be easily cut, turned, and manipulated. It is also a good electrical insulator. The shrinkage after molding is so slight that for practical purposes it may be disregarded. It reproduces and accurately retains the finest lines upon the face of the mold.

If desired, some or all of the peel may be retained, and the mass containing such peel is treated in the manner and for the purposes hereinbefore described, only in such case the resulting product will not have all the qualities of the product where the peel is excluded.

Having thus described our invention, what we claim as new, and desire to secure by Letters Patent of the United States, is—

1. The herein-described process of treating vegetable waste or refuse of the character specified, which consists in separating and rejecting the water, dirt and matters soluble in cold water, drying and disintegrating the mass, mixing therewith an adhesive waterproofing substance to render the mass waterproof, drying the now waterproofed mass, reducing it to a powder and molding said powder under pressure, substantially as described.

2. The herein-described process of treating vegetable waste or refuse produced in the manufacture of various products from potatoes or similar tubers, which consists in separating and rejecting the water, dirt, and matters soluble in cold water, drying and disintegrating the mass, mixing therewith rosin or other gum or mucilage to render the mass waterproof, drying the now waterproofed mass, reducing it to a powder and molding said powder under pressure, substantially as described.

3. The herein-described process of treating vegetable waste or refuse of the character specified, which consists in separating and rejecting the water, dirt and matters soluble in cold water, drying and reducing the mass to a powder, incorporating therewith a gummy substance and then subjecting the mass to the action of a precipitating agent, disintegrating the mass thus treated, reducing it to a powder, and then pressing said powder into a solid form, substantially as and for the purposes described.

PIETER WICHERS WIERDSMA.
  JOHANNES KUIPERS.

Witnesses:
 ALBERT MENARDA, Jr.,
 AUGUST SIEGFRIED DOCER.